March 1, 1960            E. BURRELL            2,927,145
ELECTROLYTE LEVELING SYSTEM FOR DEFERRED ACTION TYPE BATTERIES
Filed June 30, 1950
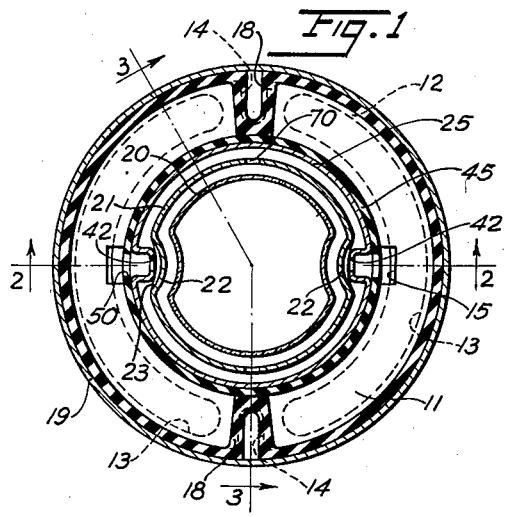
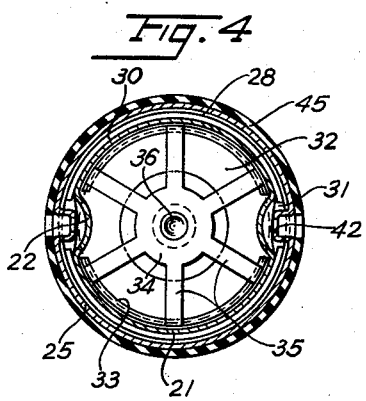
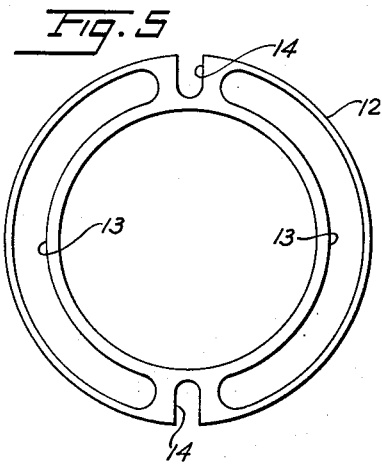
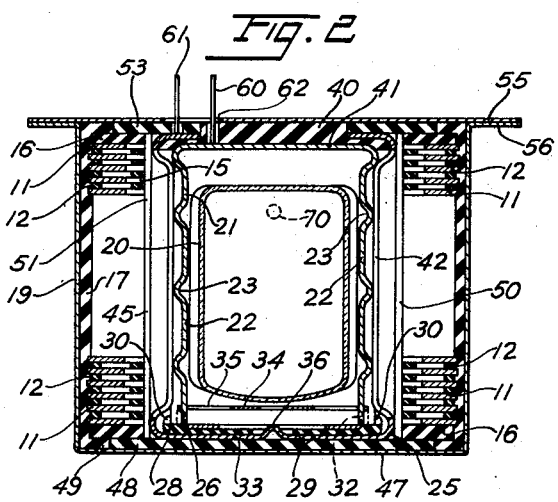
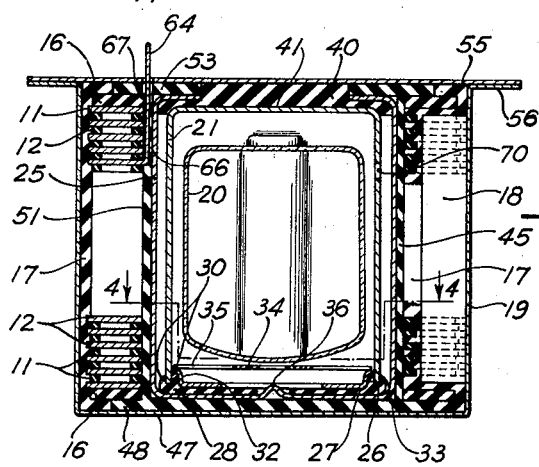
ELLIS BURRELL
INVENTOR
BY *G. D. O'Brien*
ATTORNEYS

2,927,145
Patented Mar. 1, 1960

2,927,145

ELECTROLYTE LEVELING SYSTEM FOR DEFERRED ACTION TYPE BATTERIES

Ellis Burrell, Rochester, N.Y., assignor, by mesne assignments, to the United States of America as represented by the Secretary of the Navy Application June 30, 1950, Serial No. 171,449

3 Claims. (Cl. 136—90)

This invention relates to improvements in small high voltage batteries, particularly those of the deferred action type which contain a sealed electrolyte which is not applied to the cell electrodes until immediately before use.

One of the shortcomings heretofore encountered in the use of deferred action types of batteries has been the occurrence of noise voltage early in the life of the battery. If deferred action batteries are used in electric fuzes for artillery projectiles, an excessive noise voltage may cause premature detonation of the fuzes. The source of the noise early in the life of a battery has been associated with slow attainment of equilibrium in the distribution of the electrolyte to the battery plates.

Another imperfection of deferred action type batteries has been the inefficiency of the alkaline electrolyte heretofore used most extensively in comparison with a battery utilizing an acid electrolyte. The substitution of an acid for an alkaline galvanic system makes possible the design of small volume batteries having an electrical capacity greatly in excess of batteries of the alkaline type. The use of an acid system has heretofore been impracticable because of need of small diameter leveling holes in the plates to fill the cells and to assure even distribution of electrolyte to all parts of the battery. "Short circuiting" of the cells by the electrolyte in the leveling holes results in wasteful "local action" which depletes the amount of electrolyte available to enter into electrochemical reaction and thus greatly reduces the life and the efficiency of the cells. To minimize the effects of this "short circuiting," it has heretofore been necessary to use an alkaline electrolyte which has a relatively high resistivity compared to an acid electrolyte.

It is an object of this invention to provide means of filling all the cells of a deferred action type battery with electrolyte to a predetermined level in a minimum of time.

It is also an object of the invention to provide means of distributing electrolyte from a rupturable ampule to the cells of a deferred action type battery which renders unnecessary the use of an alkaline electrolyte and allows the use of an acid galvanic system.

Another object is to provide improved means of distributing electrolyte to the cells of a deferred action type battery which obviates the necessity of using leveling holes in the plates and thus eliminates wasteful "local action" which hitherto decreased the life of batteries constructed with such leveling holes.

It is a further object to provide means of filling the cells to a uniform level by the direct radial flow of electrolyte without the use of leveling holes in the plates to attain equilibrium in the level of electrolyte which heretofore often resulted in excessive noise voltage in the battery output.

In accomplishing the objects of the present invention, a cylindrical container formed with elongated overflow vents parallel to the axis thereof and at a distance from the axis smaller than the radius of the container is positioned within the axial compartment formed in an annular stack of spaced battery plates having a jacket of insulation around the outer circumference of the stack. When a projectile containing the battery is fired, electrolyte is fed into the container and forms a cylinder of electrolyte of a depth which increases with time against the walls of the container to allow the flow of electrolyte out of the container at a uniform rate all along the overflow vents after the depth of the cylinder of electrolyte reaches the depth of the vents radially inward from the walls of the container. Under the influence of centrifugal force the electrolyte fills all the volumes between the spaced battery plates to the same predetermined level.

In the drawings:

Fig. 1 is a horizontal sectional view through a deferred action type battery unit embodying the invention;

Fig. 2 is a vertical sectional view taken on line 2—2 of Fig. 1;

Fig. 3 is a vertical sectional view taken on line 3—3 of Fig. 1;

Fig. 4 is a partial horizontal view taken on line 4—4 of Fig. 3; and

Fig. 5 is a top view of the separators that are positioned between levels of battery plates in the battery unit illustrated in Fig. 1.

In a preferred embodiment of the invention shown in the drawings, a cylindrical battery unit is constructed by assembling a number of successive half-annulus battery plates 11 approximately semicircular in outline concentrically down one half and up the other half of the battery unit. Two half-annulus plates 11 are arranged concentrically on each level with annular nonconducting separators 12 of approximately the same inner and outer radii as the plates 11 disposed between successive levels. The battery plates are fabricated of thin metal with a coating of electropositive electrode material, e.g., lead dioxide, on one surface of the plates and a coating of electronegative material, e.g., lead, on the opposite side. The coatings can be applied either by electrodeposition or by rolling thin layers of electrode material on the base plate. Battery plates 11 in successive layers have electronegative and electropositive sides face-to-face. The nonconducting separators 12 are blanked with a pair of kidney-shaped apertures 13 in the annulus thereof corresponding to the half-annulus plates 11. As shown in Fig. 5, the contour of each kidney-shaped aperture 13 includes two circular arcs of somewhat less than 180° angular displacement concentric with the circumference of the separators 12. The annular separators 12 are blanked with a narrow width across the arcuate walls between the kidney-shaped aperture 13 and the inner and outer peripheries of said separators to expose a large area of the coated surfaces of the plates 11 to the electrochemical action of electrolyte. Radial slots 14 are provided in the separators 12 between kidney-shaped apertures 13 beginning at the outer circumference and extending almost to the inner periphery thereof. Rectangular filling slots 15 are provided approximately at the center of the arc forming the inner periphery of the half-annulus battery plates 11. The bottom of a filling slot 15 is at a greater radial distance from the axis of the battery unit than the circular arc forming the inner surface of a kidney-shaped aperture 13 in a separator 12. The filling slots 15 thus overlap the kidney-shaped apertures 13 to form openings for the introduction of electrolyte into the volumes formed between the plates 11 by the kidney-shaped apertures 13. Annular insulating washers 16 assembled at the top and the bottom of the stack of battery plates 11 add rigidity to the assembled stack. A jacket of plastic material 17 is molded around the outer circumference of the assembled stack to prevent intercell leakage of electrolyte. In the process of molding the plastic jacket 17, softened plastic flows into the gaps formed between half-annulus plates 11 on the same level and into the radial slots 14 in the separators 12 to form a continuous vertical barrier of insulation 18 between the halves of the cylindrical battery unit. The plastic-jacketed stack fits snugly within a metal container 19 which is constructed preferably of deep drawing steel.

In the deferred action type battery embodying the invention shown in the drawings, electrolyte is not introduced into the volumes between successive plates until it is desired to form the cells of the battery. Before use the electrolyte is sealed within a rupturable ampule 20 which is disposed within a cylindrical inner can 21 of a pair of telescoping cup-shaped containers arranged with closed ends apart. Two diametrically opposite, inwardly extending, vertical arcuate indentations 22 are formed in the outer periphery and parallel to the axis of the cylindrical inner can 21, and a number of outwardly extending horizontal embossings 23, approximately semicircular in cross section, are formed along the arcuate indentations 22 with the result that a ladder-shaped contour is effected along the arcuate indentations 22. The rupturable ampule 20 is formed with vertical arcuate grooves corresponding to the arcuate indentations 22 to allow a snug fit between the inner can 21 and the ampule 20. The outer surface of the inner can 21 is coated with an electrode material to form one pole of the single cell, filament voltage "A" section of the assembled battery unit.

A suitable heat-hardenable insulating resin such as a polyvinyl acetal resin which can be purchased commercially under the trade name "Formex" is applied to the inner can 21 along the horizontal embossings 23 to insulate between the inner can 21 and outer can 25 in the assembled battery unit. The resin can be brushed on in liquid state and afterwards baked to form excellent electrical insulation of uniform thickness.

The inner can 21 containing the ampule 20 is assembled in telescoping engagement within a cylindrical, cup-shaped, outer can 25 with the closed ends thereof apart. A washer 28 of suitable insulating material such as hard rubber is seated against the closed end 29 of the outer can 25 to insulate and seal between the inner can 21 and outer can 25. Two upwardly extending, concentric, annular ribs 30 provided near the outer periphery of the washer 28 form a circular groove 27 to receive the open end 26 of the inner can 21. The upwardly extending annular ribs 30 are cut away at two diametrically opposite sections 31 (as shown in Fig. 4) to accommodate the arcuate indentations 22 formed in the inner can 21. A dish-shaped member 32 formed with an outwardly extending flange 33 is seated snugly against the inner of the upwardly extending annular ribs 30. Registering axial apertures are provided in both the insulating washer 28 and the dish-shaped member 32 through which a breaker point 36 embossed in the closed end 29 of the outer can 25 extends. The rupturable ampule 20 rests against a flexible spider 34 with the radial arms 35 of the spider 34 resting against the outwardly extending flange 33. The spider 34 is rigid enough to keep the rupturable ampule 20 away from the breaker point 36 under the jolts and jars incident to normal handling, but flexible enough to bend sufficiently under the high inertial forces encountered upon setback to allow the rupturable ampule 20 to smash against the breaker point 36 when the battery unit is fired in a projectile.

A cap 40 of insulating material is formed with a pocket 41 to receive the closed end of the inner can 21, and the edge of the outer can 25 at the open end thereof is spun over against the cap 40 to insulate and seal between these telescoping cans. The inner periphery of the outer can 25 is coated with electrode material of the opposite pole from the electrode material coated on the outer surface of the inner can 21. After the ampule 20 is smashed upon setback, electrolyte is introduced into the space between the inner can 21 and outer can 25 to form the single cell, filament voltage "A" section of the battery.

Two diametrically opposite overflow vents 42 punched through the outer can 25 parallel to the axis thereof are disposed opposite the vertical indentations 22 in the inner can 21 with the overflow vents 42 at a smaller radius from the axis of the outer can 25 than the walls thereof. The overflow vents 42 abut against the horizontal embossings 23 to form openings for the flow of electrolyte out of the outer can 25 between the horizontal embossings 23 and thence through the overflow vents 42 after the depth of the cylinder of electrolyte formed against the walls of the outer can 25 under the influence of centrifugal force becomes greater than the depth of the overflow vents 42 radially inward from the walls of the outer can 25. Eccentricity in axial alignment of the telescoping inner and outer cans within the axial compartment in the annular stack of battery plates cannot prevent filling of all the battery cells to an even level. The depth of the overflow vents 42 radially inward from the walls of the outer can 25 is made greater than the spacing between the inner and outer cans by a distance that exceeds the maximum eccentricity encountered in order to prevent spilling of electrolyte out of the overflow vent 42 at the point of maximum eccentricity until the electrolyte fills the entire space between the telescoping cans, after which electrolyte spills evenly out of both overflow vents 42 into the volumes between adjacent plates 11. As described hereinbefore, an insulating resin is baked on the horizontal embossings 23 to prevent short circuiting between the inner and outer cans at the points where the overflow vents 42 abut against the horizontal embossings 23.

A cylindrical sleeve 45 of insulating material having one end thereof closed is positioned within the steel container 19 with the closed end of the insulating sleeve 45 seated against the closed end 47 of the steel container 19 and with an outwardly extending flange 48 formed at the lower end of the insulating sleeve 45 abutting against the lower end 49 of the plastic jacket 17. When the telescoped inner can 21 and outer can 25 are positioned within the axial compartment formed in the annular stack with the insulating sleeve 45 disposed between the outer can 25 and the inner periphery of the battery plates 11, two rectangular openings 50 along the entire length of the vertical walls 51 of the insulating sleeve 45 are disposed between the overflow vents 42 in the outer can 25 and the rectangular filling slots 15 in the plates 11. The vertical walls 51 extend upward to the height of the top insulating washers 16 and the spun-over edge of the outer can 25. An annular insulating washer 53 is positioned between the plastic jacket 17 at the upper end thereof and an upwardly extending circular shoulder formed on the cap 40. A circular steel cap cover is secured to the assembled battery unit by soldering or welding to the outwardly extending flange 56 of the container 19. Terminals 60 and 61 secured to the inner can 21 and outer can 25 respectively extend through an aperture in the cap 40 and in the washer 53 respectively and thence through an aperture 62 in the steel cover 55 to allow external connection to the single cell, filament voltage "A" section of the battery unit. External connections are conveniently made to the cells formed between the half-annulus plates 11 by providing connection lugs 64 along the inner periphery of some of the half-annulus plates 11 which are bent upward to extend through registering apertures in the cap 55 and the annular washer 53. The insulating sleeve 45 is conveniently formed with vertical grooves 66 to receive the connection lugs 64, and insulating paper or fabric 67 is assembled between the connection lugs 64 and the inner periphery of the plates 11 to prevent short circuiting of individual cells.

When a projectile containing the battery unit embodying the invention is fired, the high inertial forces of setback acting against the ampule 20 cause the flexible spider 34 to bend until the ampule 20 strikes against the breaker point 36. The stresses produced by the impact against the breaker point 36 shatter the ampule 20 to release electrolyte into the inner can 21, and centrifugal force then causes the electrolyte to form a cylinder of fluid against the walls of the inner can 21. Two diametrically opposite spill ports 70 provided near the upper end of the inner cap 21 allow flow of electrolyte into the space between the inner can 21 and outer can 25 to form the single filament voltage "A" cell. As electrolyte continues to flow out of the spill ports 70, the cylinder of electrolyte formed against the walls of the outer can 25 under the influence of centrifugal force increases in depth until the electrolyte reaches the depth of the overflow vents 42 radially inward from the walls of the outer container 25. As electrolyte continues to flow into the outer can 25 through the spill ports 70, centrifugal force causes the fluid to flow between the horizontal embossings 23 and through the overflow vents 42, thence through the rectangular openings 50 and the filling slots 15 into the volumes in the kidney-shaped apertures 13 between adjacent battery plates 11. As the depth of the cylinder of electrolyte formed against the wall of the outer can 25 is constant along the entire height thereof, the overflow of electrolyte through the overflow vents 42, which extend the entire length of the stack of plates 11, will be the same at each section of the vent 42 to assure even distribution of electrolyte to all the cells of the battery. As the volume of electrolyte retained in the "A" cell will always be constant, the depth of electrolyte to which the cells formed between the half-annulus plates 11 will be filled can be predetermined by controlling the volume of electrolyte originally contained within the ampule 20.

It should be obvious from the drawings and the foregoing specification that a deferred action type of battery has been provided which will allow distribution of electrolyte to the cells of the battery in a minimum of time and without the necessity of using equalization channels through the plates. Noise voltages will thus be minimized, and an acid electrolyte can be utilized which will make possible the design of small volume batteries having an electrical capacity greatly in excess of batteries having an alkaline galvanic system.

While the embodiment of the present invention as herein described constitute a preferred form, it is to be understood that other forms might be adopted all coming within the scope of the claims which follow.

Having thus described my invention what I claim as new and desire to secure by Letters Patent of the United States is:

1. In a deferred action type battery, an annular stack of spaced battery plates, a jacket of insulating material around the outer circumference of the stack, a cylindrical container disposed coaxially of and within the axial compartment in said annular stack, and means for feeding electrolyte to the container under spin conditions when the battery is fired in a projectile to provide a cylinder of electrolyte of a depth which increases with time against the walls of the container, said container being formed with elongated overflow vents parallel to the axis thereof and at a distance from the axis less than the radius of said container to allow the flow of electrolyte out of said container at a uniform rate all along said overflow vents after the depth of the cylinder of electrolyte reaches the depth of said vents radially inward from said container.

2. Means for distributing electrolyte to an annular stack of spaced battery plates having a jacket of insulating material around the outer circumference of the stack, comprising a closed outer cylindrical container positioned coaxially of and within the axial compartment in said annular stack formed with a number of elongated overflow vents parallel to the axis thereof and at a smaller radius from the axis of the outer container than the walls thereof, a closed cylindrical inner container within and coaxial of said outer container formed with a number of ports in the circumference thereof, a rupturable ampule filled with electrolyte within said inner container, and means for insulating between said outer container and the battery plates whereby when a projectile containing the battery is fired, the forces of setback will rupture the ampule and centrifugal force will cause electrolyte to flow through said ports into the outer container to provide a cylinder of electrolyte against the walls of the outer container to a depth which increases with time until the depth reaches that of the elongated vents radially inward from the walls of the outer container, and electrolyte then flows out of said container to the plates of the battery at a uniform rate all along the elongated overflow vents.

3. Means for distributing electrolyte to an annular stack of spaced battery plates according to claim 2 in which the inner periphery of said outer container and the outer periphery of said inner container are coated with electrode materials of opposite polarity and also including means for insulating between said inner and outer containers.

No references cited.